United States Patent
Weksler et al.

(10) Patent No.: US 11,055,445 B2
(45) Date of Patent: Jul. 6, 2021

(54) ACTIVATING AN ELECTRONIC PRIVACY SCREEN DURING DISPLAY OF SENSITVE INFORMATION

(71) Applicant: Lenovo (Singapore) Pte. Ltd., Singapore (SG)

(72) Inventors: Arnold S. Weksler, Raleigh, NC (US); Jason Pratt Parrish, Durham, NC (US); Jerry Thomas Paradise, Durham, NC (US); Neal Robert Caliendo, Jr., Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 441 days.

(21) Appl. No.: 14/683,873

(22) Filed: Apr. 10, 2015

(65) Prior Publication Data
US 2016/0300081 A1 Oct. 13, 2016

(51) Int. Cl.
*G06F 7/04* (2006.01)
*G06F 21/84* (2013.01)
*H04B 1/3827* (2015.01)
*H04W 4/02* (2018.01)

(52) U.S. Cl.
CPC ........... *G06F 21/84* (2013.01); *H04B 1/3827* (2013.01); *H04W 4/027* (2013.01)

(58) Field of Classification Search
CPC ............ G06F 21/6245; G06Q 30/0226; G06Q 30/0254
USPC ........................................................ 726/28
See application file for complete search history.

(56) References Cited

U.S. PATENT DOCUMENTS

| | | | | |
|---|---|---|---|---|
| 7,546,334 B2* | 6/2009 | Redlich | ................. | G06F 21/554 709/201 |
| 7,669,051 B2* | 2/2010 | Redlich | ............... | G06F 21/6209 713/166 |
| 8,091,138 B2* | 1/2012 | Yellepeddy | ......... | G06F 21/6245 380/28 |
| 9,058,509 B1* | 6/2015 | Yang | ....................... | G06F 21/84 |
| 2003/0046401 A1* | 3/2003 | Abbott | .................... | G06F 9/451 709/228 |
| 2004/0193910 A1* | 9/2004 | Moles | ..................... | G06F 21/62 726/27 |
| 2004/0201844 A1* | 10/2004 | Loney | ................ | G01N 21/6428 356/318 |
| 2008/0025645 A1* | 1/2008 | Jakobson | ................ | G06F 21/62 382/300 |
| 2010/0124363 A1* | 5/2010 | Ek | ....................... | G06F 21/6245 382/118 |
| 2010/0205667 A1* | 8/2010 | Anderson | ............... | G06F 3/013 726/19 |
| 2010/0259560 A1* | 10/2010 | Jakobson | ................ | G06F 21/62 345/629 |
| 2012/0173635 A1* | 7/2012 | Wormald | ............. | G06Q 10/107 709/206 |
| 2014/0013437 A1* | 1/2014 | Anderson | ............... | G06F 21/60 726/26 |

(Continued)

*Primary Examiner* — Samson B Lemma
(74) *Attorney, Agent, or Firm* — Ference & Associates LLC

(57) ABSTRACT

One embodiment provides a method including: receiving, on a display device, a request to display data; detecting, using a processor, a factor indicating a need for privacy; activating, based on the detecting, a privacy filter of the display device; and displaying, on the display device, the data. Other aspects are described and claimed.

20 Claims, 4 Drawing Sheets

(56) References Cited

U.S. PATENT DOCUMENTS

| | | | |
|---|---|---|---|
| 2014/0150114 A1* | 5/2014 | Sinha | G06F 21/62 |
| | | | 726/28 |
| 2014/0256288 A1* | 9/2014 | Allen | H04W 12/02 |
| | | | 455/411 |
| 2015/0033366 A1* | 1/2015 | Guffrey | H04W 4/21 |
| | | | 726/29 |
| 2015/0100908 A1* | 4/2015 | Magistrado | G06F 3/0484 |
| | | | 715/766 |
| 2016/0205556 A1* | 7/2016 | Borghei | H04M 3/42221 |
| | | | 455/411 |

* cited by examiner

ACTIVATING AN ELECTRONIC PRIVACY SCREEN DURING DISPLAY OF SENSITVE INFORMATION

BACKGROUND

Information handling devices ("devices"), for example cell phones, smart phones, tablet devices, laptop computers, and the like permit users to create, access and store a variety of different media or data on their mobile devices. The media or data may include, for example, pictures or images, videos, audio content, text or other documents, etc. This ease of access to media allows users access to the media regardless of time or location. For example, it is typical for employees to receive work related email communications even during off hours.

However, this constant connection can lead to problems when the data being accessed by a user is confidential in nature. Although businesses benefit from having their employees constantly connected to the corporate world, it can have negative consequences when an employee is viewing sensitive work documents in a public place, or sharing them with unauthorized viewers. However, completely restricting employee access to data is viewed as an overly burdensome and restrictive solution.

BRIEF SUMMARY

In summary, one aspect provides a method, comprising: receiving, on a display device, a request to display data; detecting, using a processor, a factor indicating a need for privacy; activating, based on the detecting, a privacy filter of the display device; and displaying, on the display device, the data.

Another aspect provides an information handling device, comprising: a processor; a display device; a memory device that stores instructions executable by the processor to: receive a request to display a data; detect a factor indicating a need for privacy; activate, based on the detecting, a privacy filter of the display device; and display, on the display device the data.

A further aspect provides a product, comprising: a storage device having code stored therewith, the code being executable by a processor and comprising: code that receives, at an input device, a request to display data; code that detects a factor indicating a need for privacy; code that activates, based on the detecting, a privacy filter of the display device; and code that displays, on the display device, the data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
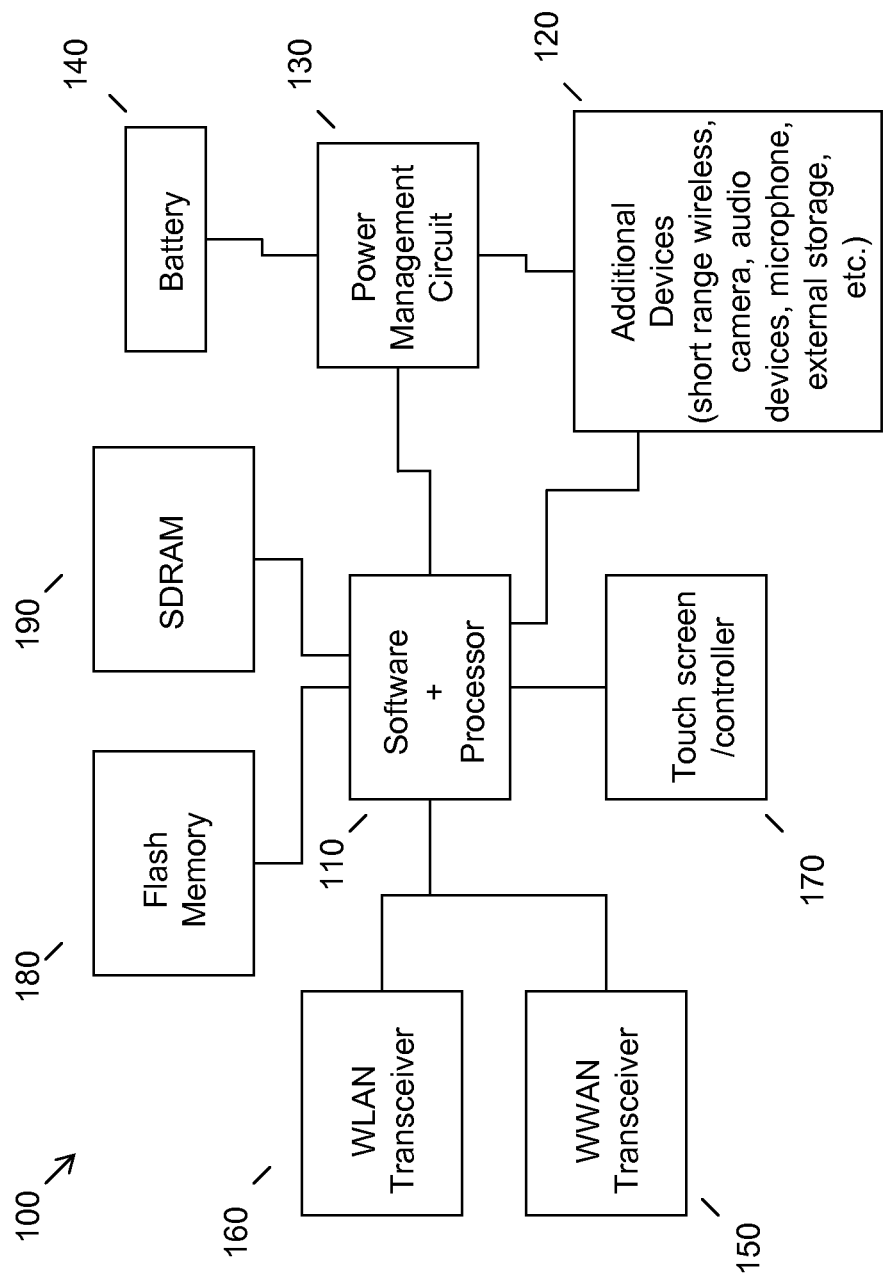
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As technology continues to improve, more media will be consumed on mobile devices by users on the go. Although as a whole mobile productivity is beneficial, it can have unintended consequences. One of the most important issues businesses deal with regularly is the control and regulation of sensitive or confidential information. The ability of a company or organization to control their confidential and/or sensitive information is greatly decreased when they enable employees to view or utilize that information out of the office.

One of the major concerns of enabling mobile devices is the possibility that sensitive data will be viewed by non-approved entities. For example, an employee viewing confidential designs in an airport may inadvertently divulge the information to the multiple other airline passengers who can also view it. One current solution is the use of physical privacy filters that can be placed directly on the device. For example, 3M's Privacy Screen Protector. These filters work by overlaying a thin polarized material on the display screen, thus restricting the viewing angle of the display. 3M is a registered trademark of 3M Company in the United States of America and other countries.

However, this style of privacy filter can be removed by a user due to their personal preference, or in order more easily to share non-sensitive information with others. Once removed, the physical filter material is unlikely to be replaced and any subsequent viewing of sensitive material will be without the additional privacy protection. Therefore, this technical issue presents problems when a user interferes with the privacy protection screen. Thus, a much more convenient solution in many scenarios, involves a solution that can accommodate both the user's preference regarding non-sensitive materials and the companies need to ensure the privacy filter is active when viewing sensitive material.

Accordingly, an embodiment provides a method of receiving an input request for data (e.g., a user requesting a file or application be opened) on an electronic device. Upon receiving the request, determining the location of the electronic device using GPS or similar location method. The device then compares the determined location against a set of predetermined locations to determine if the device is currently in an unsecure area. If the device is determined to be in an unsecure area, a privacy filter is electronically activated on the display, and then the requested information is displayed.

In another embodiment, a method receives an input request for data similar to the above. Upon receiving the request, the device accesses metadata associated with the data being requested (e.g., a user requests a secure email to be opened and the email has included with it metadata indicating it contains sensitive information). Based on the information stored in the metadata, a determination is made as to whether the requested data is of a sensitive nature (e.g., contains personal information or confidential company information). If it is determined, based on the metadata, that the file contains sensitive material, a privacy filter is electronically activated, and the requested data is displayed.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
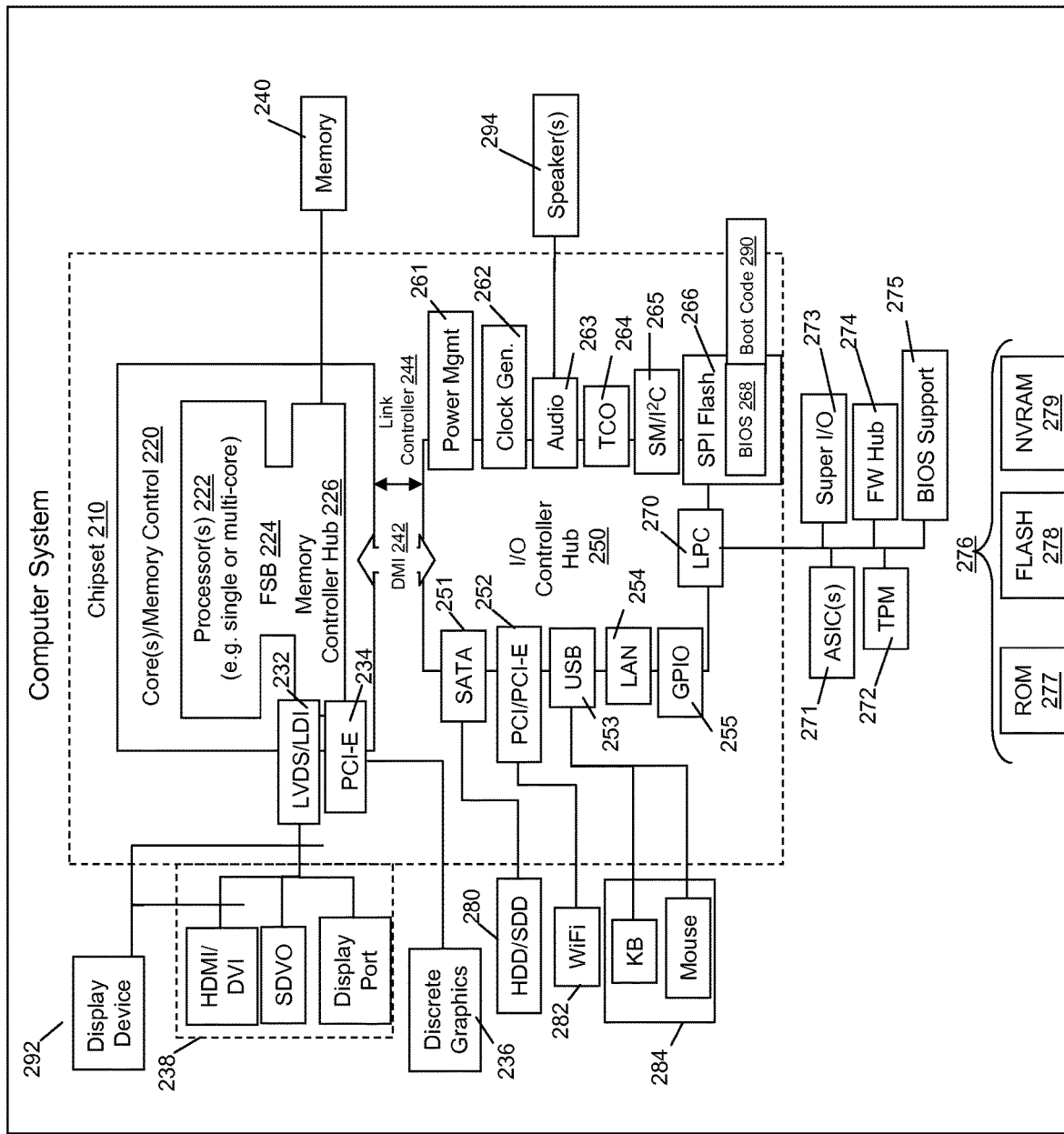
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to access sensitive information on. For example, the circuitry outlined in FIG. 1 may be implemented in a tablet or smart phone embodiment, whereas the circuitry outlined in FIG. 2 may be implemented in a personal computer embodiment.

Figure 3:
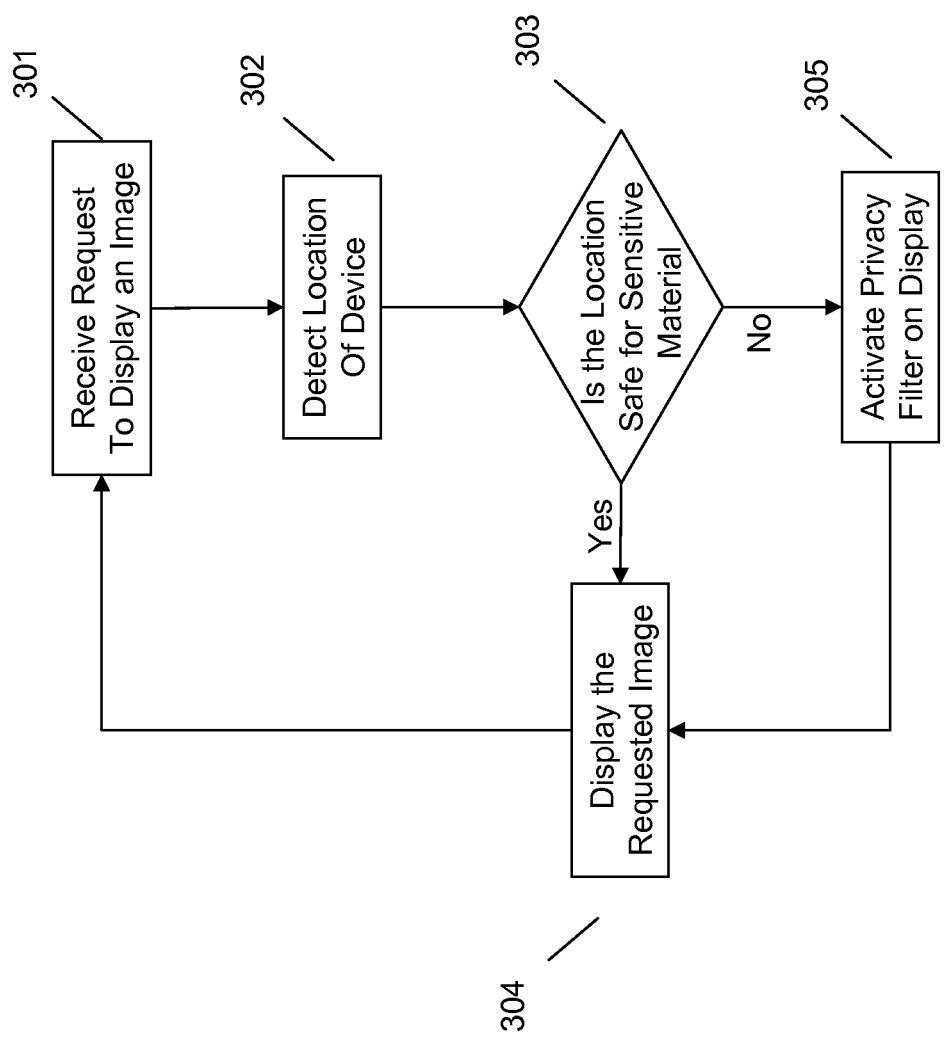
FIG. 3 illustrates an example method of automatically enabling a privacy filter.

Referring now to FIG. 3, an embodiment receives a request to display an image at 301. The term image is used herein to generally describe any media or data that can be presented to a user on a device (e.g., text, pictures, text entry fields, applications interfaces, videos, audio content, etc.). For example, a user could request to view a company email, open a confidential document, or just play a game. Once the request is received at 301, an embodiment detects the current device location at 302. The location detection may be accomplished by an onboard sensor or an external sensor within close proximity to the device. The sensor may be any type capable of determining device location (e.g., GPS, multilateration of radio signals between cellular towers, Wi-Fi connections, etc.).

Once the device location is detected at 302, an embodiment determines if the location is considered a secure location to display sensitive material (e.g., company conference room, client business location, etc.) at 303. By way of example, an embodiment, may determine, based on the device location, that the device is in a predetermined restricted area (e.g., an airport, sporting venue, foreign country, etc.) and thus it is unsafe to display sensitive material at 303. Alternatively, an embodiment may determine that the device is in a predetermined secure area (e.g., in a user's residence, in a work place office, at a remote jobsite, etc.) and thus it would be secure to fully display the requested data without restriction (e.g., a privacy filter) at 303.

Additionally or alternatively, an embodiment may detect when a device has left a specific location at 302. For example, a device may determine it is within a secure boundary if connected to the company Wi-Fi (thus indicating the user is within the boundaries of the company office space). This may generally be referred to as geo-fencing. Geo-fencing can be any dynamically generated shape or formation that creates a virtual boundary to be detected by a device. Geo-fencing as with the general location tracking can be accomplished via any typical location based sensing system (e.g., GPS, multilateration of radio signals between cellular towers, WiFi connetions, etc.).

If it is determined that the location is safe for the purposes of displaying sensitive materials at 303, an embodiment will then display the requested image data to the user at 304. However, if it is determined that the location is unsecure, an electronically activated privacy screen will be enabled at 305. This privacy filter enables a user to view sensitive material while minimizing the risk that an unauthorized third party gets access. Once the privacy filter is enabled an embodiment will then display the requested image at 304.

Figure 4:
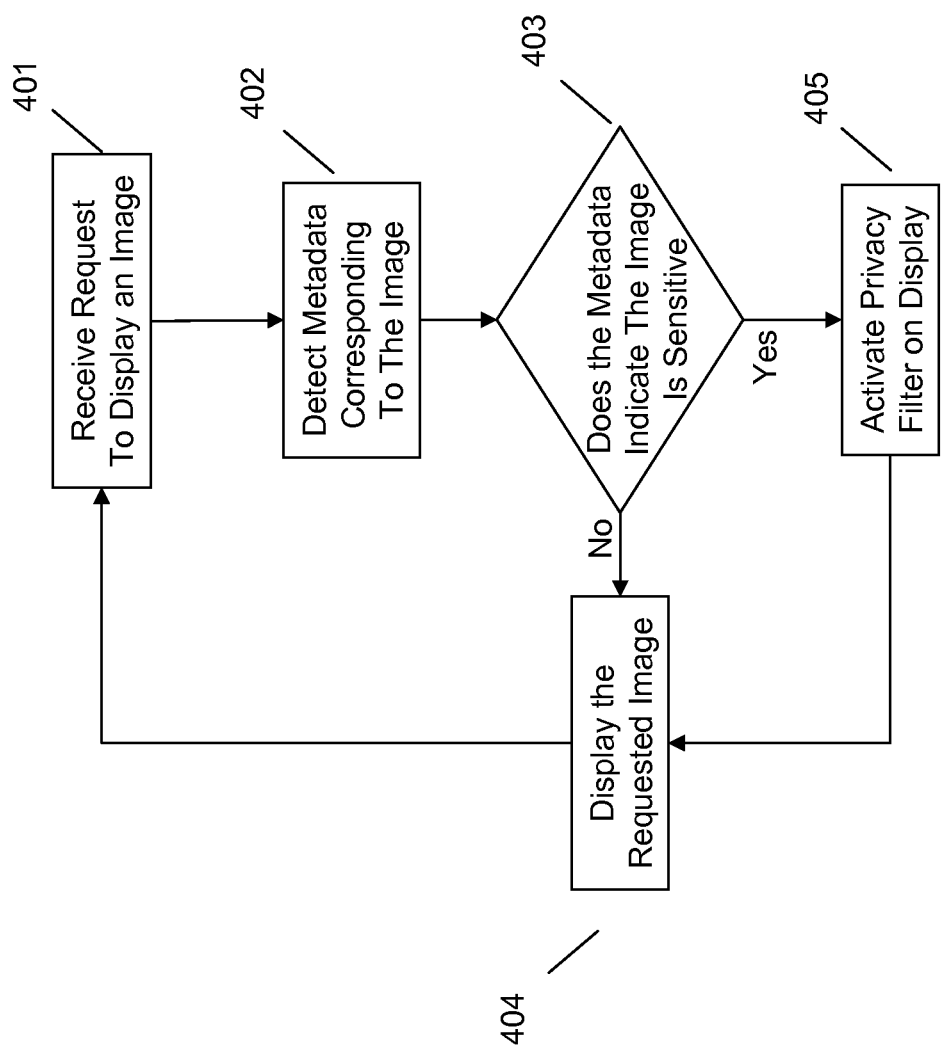
FIG. 4 illustrates an additional example method of automatically enabling a privacy filter.

Referring now to FIG. 4, an embodiment may receive a request to display an image at 401. For example, a user could request to view a company email, open a confidential document, or just play a game. Once the request is received at 401, an embodiment detects metadata corresponding to the requested image at 402. Metadata is data that describes features or characteristics of other stored data (e.g., creation date, geo-location of creation, etc,). In the current embodiment the image being requested may contain specific metadata relating to the content of the requested data (e.g., that an email contains personal information, which has been identified as private by the sender).

In a further embodiment, the detected metadata at 402 comprises a security setting. The security setting may have different tier levels thus allowing for certain activities but restricting others (e.g., a tier that only allows the opening of a document when the device is connected to a specific company Wi-Fi access point, or alternatively a tier that allows opening of a document when the device is determined to be located on the companies premises and connected to company Wi-Fi). The security setting is used to limit the exposure of the sensitive requested data.

In an embodiment, the security setting is determined during the creation of the data and stored in the metadata by the creator (e.g., a human resources employee labeling an office email as confidential due to it containing private employee records.). This allows the data creator to determine what level of security is required based on the information they include.

An embodiment may allow a user to modify the security settings stored in the metadata. For example, a team drafted confidential document is imparted with file security settings by the creator. However, an embodiment allows a team member, e.g., even if other than the data creator, to disable some or all of the security features in order to share or publish the document.

An embodiment may lock the security settings stored in the metadata, thus not allowing future users of the data to alter the security settings. Typically, users may attempt to remove certain settings that may impede their efforts (e.g., make the displayed image harder to see). Current privacy filters may inhibit viewing in certain lighting conditions, which may lead users to remove the protective material. However, an electronically controlled privacy filter, such as that described herein, may be implemented such that it cannot be removed by a user. Therefore, a creator of the document has more control over the ability to disable the privacy filter feature that ensures sensitive data is protected and thereby preventing user error.

Once the metadata is detected at 402, an embodiment determines if the metadata contains security settings indicating that the data contains sensitive material (e.g., confidential, undisclosed company trade secrets, etc.) at 403. By way of example, an embodiment, may determine, based on the security settings stored in the metadata that the requested data contains company trade secrets and is thus unsafe for typical non-protected display at 403. Alternatively, an embodiment may determine that the metadata does not include any restrictive security settings and is thus secure to fully display the requested data without restriction at 403.

If it is determined, based on the security settings, that the requested data is safe for the purposes of display at 403, an embodiment will then display the requested image data to the user at 404. However, if it is determined that the requested data does include security settings stored in the metadata, an electronically activated privacy screen will be enabled at 405. This privacy filter enables a user to view sensitive material while minimizing the risk that an unauthorized third party gets access. Once the privacy filter is enabled an embodiment will then display the requested image at 403.

Referring now to FIG. 3 and FIG. 4, in an embodiment, the security settings stored within metadata at 402 may be combined with the detected location of the device at 302, thus allowing for greater flexibility of control of sensitive data. For example, although the device may be located in an airport (i.e., a previously discussed unsecure location), if the security settings indicate the data does not contain sensitive data the privacy filter will not be activated. Alternatively, even if the user is located at a predetermined secure location (e.g., an offsite work location) the data creator may still specify that the security settings activate the privacy display at all or certain predetermined secure locations.

In an embodiment the privacy filter may be activated via a hardware aspect of the display. For example, an embodiment may implement pixel manipulation, polarization, adjustment of viewing angle, or the like based on altering a hardware setting of the display device. An embodiment also may activate a privacy filter via a software implementation, e.g., dimming the display, providing a transparent or pattern overlay, etc. A combination of hardware and software privacy filtering may be implemented.

Accordingly, as illustrated by the example embodiments and figures, an embodiment provides a method of receiving an input request for data at an electronic device. Then determining, using a sensor device, the location of the electronic device. Once the location is determined, the device compares the determined location against a set of predetermined locations to decide if the device is in an unsecure (e.g., populated) area. Based on the determination, the device may electronically activate a privacy filter on the display, thus protecting the requested information that is being displayed.

The various embodiments described herein thus represent a technical improvement including a method of receiving an input request for data. Accessing stored metadata that is associated with the requested data, and based on the information stored in the metadata (e.g., security settings) a determination is made as to whether the requested data is of a sensitive nature. If, based on the security settings, it is determined the file contains sensitive or confidential material, a privacy filter is electronically activated and the requested data is displayed with the additional security of the privacy filter.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, on a display device, a request to display data;
detecting, using a processor, whether a factor indicating a need for privacy is present;
activating, responsive to detecting that a factor indicating a need for privacy is present, an electronic privacy filter of the display device; and
displaying, on the display device, the data with the electronic privacy filter, wherein the data with the electronic privacy filter is viewable by a user.

2. The method of claim 1, wherein the factor comprises the display device location.

3. The method of claim 2, wherein the detecting comprises determining, based on the display device location, if the device is in a predetermined area.

4. The method of claim 2, wherein the detecting comprises determining that the device is moving above a threshold speed.

5. The method of claim 1, wherein the activating comprises modifying a hardware aspect of the display device.

6. The method of claim 1, wherein the factor is selected from the group consisting of metadata corresponding to the data to be displayed and the data to be displayed.

7. The method of claim 6, wherein the metadata comprises security data.

8. The method of claim 7, wherein the security data comprises location data.

9. The method of claim 7, wherein the security data is determined during creation of the data to be displayed; and
wherein the security data is modifiable by a user.

10. The method of claim 7, wherein the security data is determined during creation of the data to be displayed; and
wherein the security data is not modifiable by a user.

11. An information handling device, comprising:
a processor;
a display device;
a memory device that stores instructions executable by the processor to:
receive a request to display a data;
detect whether a factor indicating a need for privacy is present;
activate, responsive to detecting that a factor indicating a need for privacy is present, an electronic privacy filter of the display device; and
display, on the display device the data with the electronic privacy filter, wherein the data with the electronic privacy filter is viewable by a user.

12. The information handling device of claim 11, wherein the factor comprises the display device location.

13. The information handling device of claim 12, wherein the detecting comprises determining, based on the display device location, if the device is in a predetermined area.

14. The information handling device of claim 12, wherein the detecting comprises determining, based on the device location, if the device is in a predetermined area.

15. The information handling device of claim 12, wherein the detecting comprises determining, that the device is moving above a threshold speed.

16. The information handling device of claim 11, wherein the activating comprises modifying a hardware aspect of the display device.

17. The information handling device of claim 11, wherein the factor is selected from the group consisting of metadata corresponding to the data to be displayed.

18. The information handling device of claim 17, wherein the metadata comprises security data; and
wherein the security data comprises location data.

19. The information handling device of claim 17, wherein the metadata comprises security data determined during creation of the data to be displayed; and
wherein the security data has a characteristic selected from the group consisting of: being modifiable by a user and not being modifiable by a user.

20. A product, comprising:
a storage device having code stored therewith, the code being executable by a processor and comprising:
code that receives, at an input device, a request to display data;
code that detects whether a factor indicating a need for privacy is present;
code that activates, responsive to detecting that a factor indicating a need for privacy is present, an electronic privacy filter of the display device; and
code that displays, on the display device, the data with the electronic privacy filter, wherein the data with the electronic privacy filter is viewable by a user.

* * * * *